(12) United States Patent
Zhang et al.

(10) Patent No.: US 11,838,149 B2
(45) Date of Patent: Dec. 5, 2023

(54) TIME DIVISION CONTROL OF VIRTUAL LOCAL AREA NETWORK (VLAN) TO ACCOMMODATE MULTIPLE VIRTUAL APPLICATIONS

(71) Applicant: Dell Products L.P., Round Rock, TX (US)

(72) Inventors: Xiaoyu Zhang, Shanghai (CN); Yuxin Qin, Shanghai (CN); Chenjie Zhou, Shanghai (CN); Xiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/580,036

(22) Filed: Jan. 20, 2022

(65) Prior Publication Data
US 2023/0198806 A1   Jun. 22, 2023

(30) Foreign Application Priority Data
Dec. 21, 2021  (CN) .......................... 202111575520.1

(51) Int. Cl.
*H04L 12/46* (2006.01)
*H04L 49/354* (2022.01)

(52) U.S. Cl.
CPC ........ *H04L 12/4675* (2013.01); *H04L 12/467* (2013.01); *H04L 12/4666* (2013.01); *H04L 49/354* (2013.01)

(58) Field of Classification Search
CPC ............. H04L 12/4675; H04L 12/4666; H04L 12/467; H04L 49/354
See application file for complete search history.

(56) References Cited

U.S. PATENT DOCUMENTS

| | | | | |
|---|---|---|---|---|
| 2012/0314579 | A1* | 12/2012 | Matsuike | ............ H04L 43/0894 370/236 |
| 2014/0082166 | A1* | 3/2014 | Robinson | .............. G06F 9/5072 709/223 |
| 2021/0344615 | A1* | 11/2021 | Ishibashi | ............... H04L 47/781 |
| 2022/0150131 | A1* | 5/2022 | Vandikas | .............. H04L 41/147 |

* cited by examiner

*Primary Examiner* — Luat Phung
(74) *Attorney, Agent, or Firm* — Jackson Walker L.L.P

(57) ABSTRACT

Disclosed methods define VLAN time slots for one or more VLANs within an HCI environment. A management resource may control virtual application access to each VLAN in accordance with the VLAN time slots wherein only one virtual application may connect to the VLAN during a VLAN time slot. Disclosed methods may define VLAN time slots for each of the plurality of virtual applications. The VLAN time slots may be defined dynamically, wherein durations of the VLAN time slots may be re-calculated each VLAN cycle. A duration of the VLAN time slot for a particular virtual application may be determined based on the number of packets transmitted by the virtual application during a previous VLAN cycle. Each VLAN time slot may include an active interval, for transmitting packets, and an inactive interval. Each active interval may include a fixed duration base interval and a variable duration dynamic interval.

14 Claims, 4 Drawing Sheets

```
600
        ┌─────────┐
        │  BEGIN  │
        └────┬────┘
             │
             ▼
602  ┌────────────────────────────────────────────────────────┐
     │ DEFINE A PLURALITY OF TIME SLOTS FOR A VLAN WHEREIN    │
     │ THE TIME SLOTS INCLUDE A TIME SLOT CORRESPONDING TO    │
     │ EACH OF A PLURALITY OF VAPPS ASSOCIATED WITH THE VLAN  │
     └────────────────────────┬───────────────────────────────┘
                              │
                              ▼
604  ┌────────────────────────────────────────────────────────┐
     │ CONTROL ACCESS TO THE VLAN IN ACCORDANCE WITH THE      │
     │ VLAN TIME SLOTS SUCH THAT EACH VAPP MAY ACCESS THE     │
     │ VLAN DURING ONE OF THE TIME SLOTS AND WHEREIN NO       │
     │ MORE THAN ONE VAPP MAY ACCESS THE VLAN DURING ANY      │
     │ OF THE TIME SLOTS                                      │
     └────────────────────────┬───────────────────────────────┘
                              │
                              ▼
                         ┌─────────┐
                         │   END   │
                         └─────────┘
```

TIME DIVISION CONTROL OF VIRTUAL LOCAL AREA NETWORK (VLAN) TO ACCOMMODATE MULTIPLE VIRTUAL APPLICATIONS

TECHNICAL FIELD

The present disclosure relates to management of information handling systems and, more particularly, management of virtualized applications communicating via a virtualized local area network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured with a hyper-converged infrastructure (HCI), often using standard hardware including, as a non-limiting example, x86-based servers. In the context of a data center, as an example, HCI may be broadly defined as an information technology (IT) implementation that natively integrates all data center functions, including compute, storage, and networking, in a virtualized platform operated and monitored through a unified management console. HCI environments may create a very large number of virtual applications within a single layer 2 domain, e.g., a single Ethernet network. However, an Ethernet network cannot support more than 4096 virtual local area networks (VLANs) due to the 12-bit VLAN ID (VID) specified by IEEE 802.1Q. Accordingly, an HCI environment may experience or exhibit VLAN scarcity and/or contention.

SUMMARY

In accordance with teachings disclosed herein, common problems associated with a potentially excessive number of virtualized computing resources competing for a potentially limited number of virtualized network/access resources within an HCI or similar environment, are addressed by disclosed resource management methods and systems. Disclosed systems may divide the time domain into a plurality of time slots corresponding to a plurality of virtualized compute resources. Within any of the time slots only one VAPP can connected to the VID. Scripts may be employed to control the connection dynamically and periodically according to network usage or packet traffic. Disclosed systems may include a management resource configured to perform disclosed resource management operations. The management resource may define time slots for one or more virtualized network resources including, as an illustrative and non-limiting example, one or more virtual local area network (VLANs), each of which is associated with a VLAN identifier (VID). Each of a plurality of virtualized compute resources, including virtual machines (VMs) and virtual applications (VAPPs), executing within the HCI environment may be associated with a corresponding VID.

In at least one embodiment, the management resource defines, for each VID, time slots, referred to herein as VLAN time slots, for each compute resource associated with the VID. The aggregate of all VLAN time slots defined for a particular VID may be referred to herein as a VLAN cycle. The management resource may control access to a VLAN such that each virtual application associated with the VLAN may access the VLAN during one time slot per VLAN cycle and such that no more than one virtual application may access the VLAN during any time slot.

In some embodiments, VLAN time slots may be defined dynamically, wherein durations of the VLAN time slots may be re-calculated for each VLAN cycle. The duration of a VLAN time slot for a particular virtual application may be determined based, at least in part, on the number of packets transmitted or otherwise processed by the particular virtual application during one or more previous VLAN cycles. As suggested above, each VLAN time slot may be associated with a corresponding virtual application. In addition, each VLAN time slot may include an active interval, during which one or more packets may be transmitted, and an inactive interval, during which packet transmission may be prohibited. In such embodiments, each active interval may include a fixed-duration base interval and a variable-duration dynamic interval.

The duration of the dynamic interval for a particular virtual application may be based, at least in part, on a number of packets transmitted by the particular virtual application during one or more previous VLAN cycles. In addition, the duration of the dynamic interval for a particular virtual application may be based, at least in part, on a packet ratio for the particular virtual application, wherein the packet ratio indicates a ratio of the packets transmitted by the particular virtual application during the one or more VLAN cycles to the total number of packets transmitted during the one or more previous VLAN cycles. In addition, the duration of the dynamic interval for a particular virtual application may be equal to a product of the packet ratio for the particular application during a previous VLAN cycle and a sum of all dynamic intervals for the previous VLAN cycle.

An HCI environment may include and/or support a plurality of distinct VLANs corresponding to a plurality of VIDs and, in such environments, disclosed time slot based access control methods may be performed independent for each distinct VID. For example, distinct VLAN time slots may be defined for each of the plurality of VIDs.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
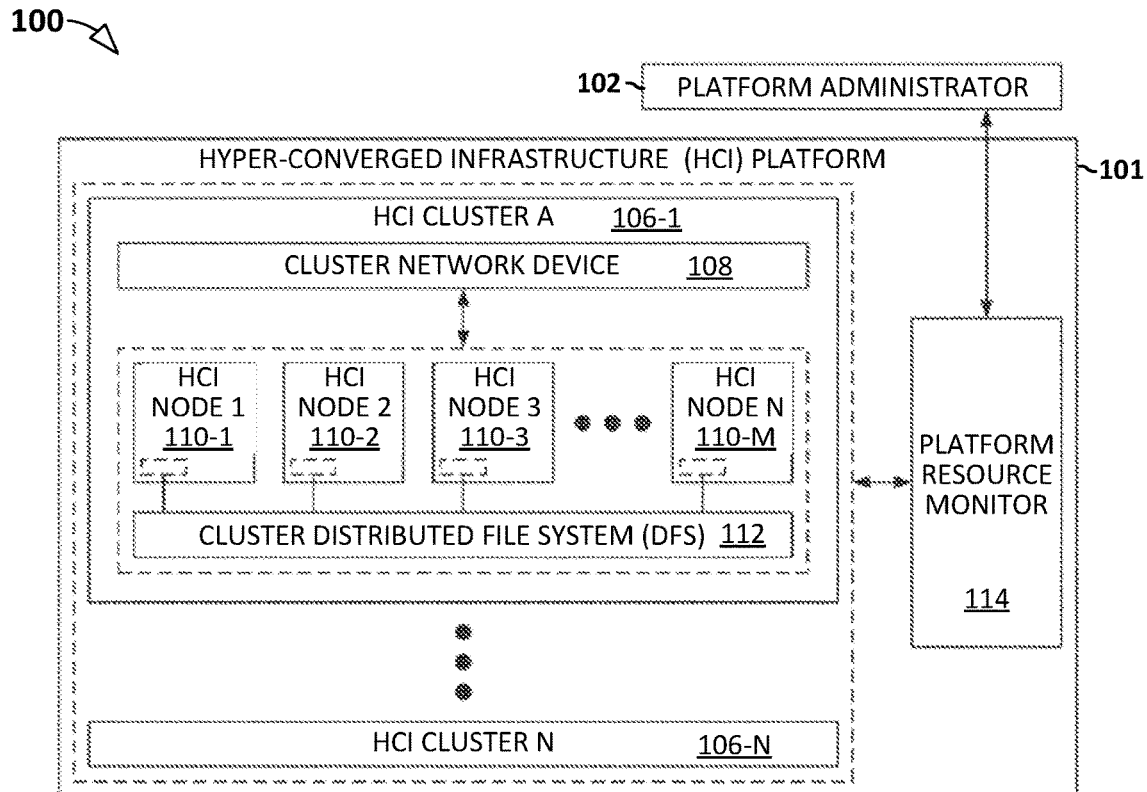
FIG. 1 illustrates a block diagram of a hyper-converged infrastructure (HCI) environment include one or more HCI clusters, each of which may include one or more HCI nodes.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 2:
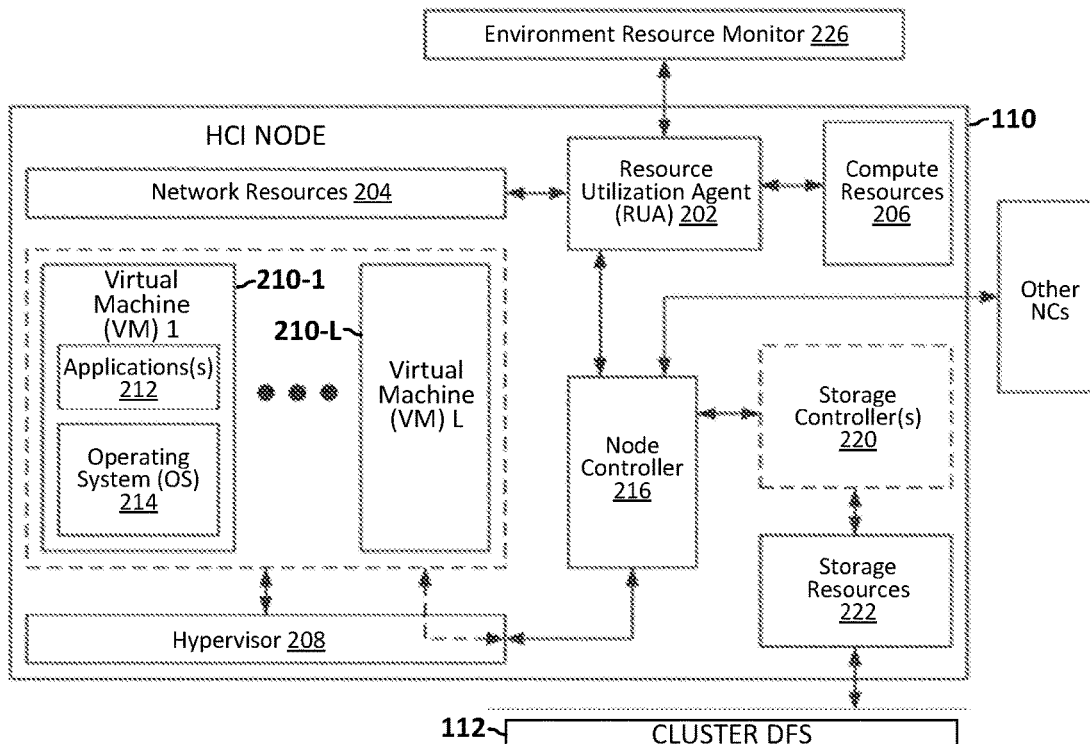
FIG. 2 illustrates elements of an HCI node.

Before describing disclosed features for monitoring and managing event messages in a distributed computing environment, an exemplary HCI platform suitable for implementing these features is provided. Referring now to the drawings, FIG. 1 and FIG. 2 illustrate an exemplary information handling system 100. The information handling system 100 illustrated in FIG. 1 and FIG. 2 includes a platform 101 communicatively coupled to a platform administrator 102. The platform 101 illustrated in FIG. 1 is an HCI platform in which compute, storage, and networking resources are virtualized to provide a software defined information technology (IT) infrastructure. Administrator 102 may be any computing system with functionality for overseeing operations and maintenance pertinent to the hardware, software, and/or firmware elements of HCI platform 101. Platform administrator 102 may interact with HCI platform 101 via requests to and responses from an application programming interface (API) (not explicitly depicted). In such embodiments, the requests may pertain to event messaging monitoring and event messaging state management described below. The HCI platform 101 illustrated in FIG. 1 may be implemented as or within a data center and/or a cloud computing resource featuring software-defined integration and virtualization of various information handling resources including, without limitation, servers, storage, networking resources, management resources, etc.

The HCI platform 101 illustrated in FIG. 1 includes one or more HCI clusters 106-1 through 106-N communicatively coupled to one another and to a platform resource monitor (PRM) 114. Each HCI cluster 106 illustrated in FIG. 1 encompasses a group of HCI nodes 110-1 through 110-M configured to share information handling resources. In some embodiments, resource sharing may entail virtualizing a resource in each HCI node 110 to create a logical pool of that resource, which, subsequently, may be provisioned, as needed, across all HCI nodes 110 in HCI cluster 106. For example, when considering storage resources, the physical device(s) (e.g., hard disk drives (HDDs), solid state drives (SSDs), etc.) representative of the local storage resources on each HCI node 110 may be virtualized to form a cluster distributed file system (DFS) 112. In at least some such embodiments, cluster DFS 112 corresponds to a logical pool of storage capacity formed from some or all storage within an HCI cluster 106.

An HCI cluster 106, and the one or more HCI nodes 110 within the cluster, may represent or correspond to an entire application or to one or more of a plurality of micro services that implement the application. As an example, an HCI cluster 106 may be dedicated to a specific micro service in which multiple HCI nodes 110 provide redundancy and support high availability. In another example, the HCI nodes 110 within HCI cluster 106 include one or more nodes corresponding to each micro service associated with a particular application.

The HCI cluster 106-1 illustrated in FIG. 1 further includes a cluster network device (CND) 108, which facilitates communications and/or information exchange between the HCI nodes 110 of HCI cluster 106-1 and other clusters 106, PRM 114, and/or one or more external entities including, as an example, platform the administrator 102. In at least some embodiments, CND 108 is implemented as a physical device, examples of which include, but are not limited to, a network switch, a network router, a network gateway, a network bridge, or any combination thereof.

PRM 114 may be implemented with one or more servers, each of which may correspond to a physical server in a data center, a cloud-based virtual server, or a combination thereof. PRM 114 may be communicatively coupled to all HCI nodes 110 across all HCI clusters 106 in HCI platform 101 and to platform administrator 102. PRM 114 may include a resource utilization monitoring (RUM) service or feature with functionality to monitor resource utilization parameters (RUPs) associated with HCI platform 101.

FIG. 2 illustrates an exemplary HCI node 110 in accordance with disclosed subject matter. HCI node 110, which may be implemented with a physical appliance, e.g., a server (not shown), implements hyper-convergent architecture, offering the integration of virtualization, compute, storage, and networking resources into a single solution. HCI node 110 may include a resource utilization agent (RUA) 202 communicatively coupled to network resources 204, compute resources 206, and a node controller 216. The node controller 216 illustrated in FIG. 2 is coupled to a hypervisor 208 that supports one or more virtual machines (VMs) 210-1 through 210-L), each of which is illustrated with an operating system (OS) 214 and one or more application program(s) 212. The illustrated node controller 216 is further coupled to storage components including zero or more optional storage controllers 220, for example, a small computer system interface (SCSI) controller, and storage components 222.

In some embodiments, RUA 202 is tasked with monitoring the utilization of virtualization, compute, storage, and/or network resources on HCI node 110. Thus, the node RUA 202 may include functionality to: monitor the utilization of: network resources 204 to obtain network resource utilization parameters (RUPs), compute resources 206 to obtain compute RUPs, virtual machines 210 to obtain virtualization RUPs, storage resources 222 to obtain storage RUPs. RUA 202 may provide some or all RUPs to environment resource monitor (ERM) 226 periodically through pull and/or push mechanisms.

Figure 3:
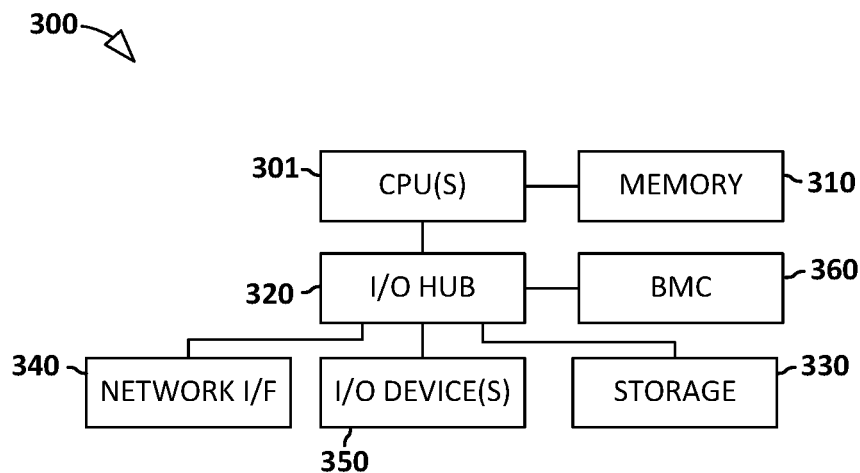
FIG. 3 illustrate an exemplary information handling system.

Referring now to FIG. 3, one or more of the HCI components illustrated in FIG. 1 and FIG. 2 may be instantiated as or within a physical resource exemplified by the information handling system 300 illustrated in FIG. 3. The illustrated information handling system include one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

Figure 4:
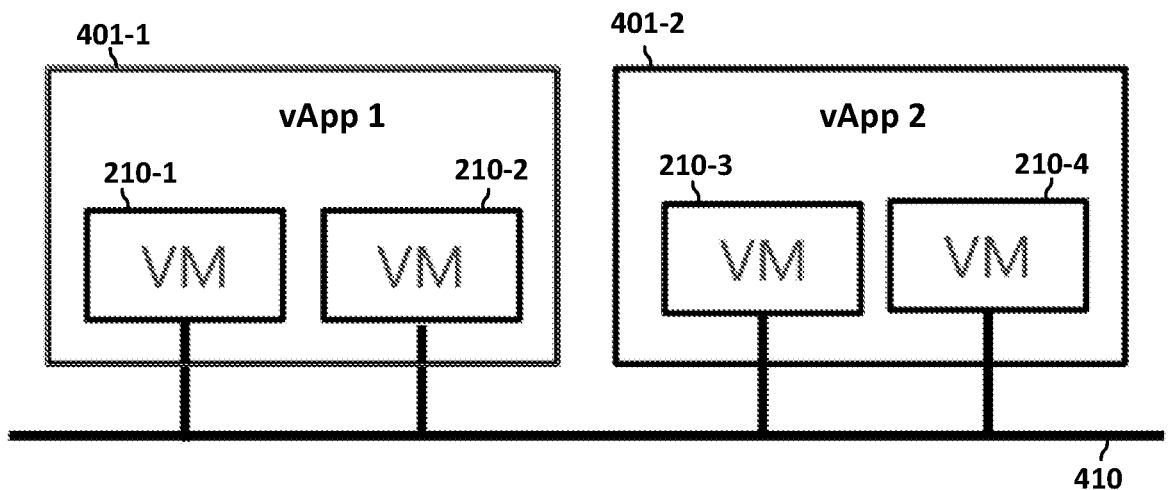
FIG. 4 is a block diagram illustrating two VAPPs, each of which encompasses two VMs, connected to VLAN.

FIG. 4 illustrates exemplary virtualized compute resources of a type that may benefit from disclosed methods for managing potentially scarce virtualized network resources. More specifically, FIG. 4 illustrates two instances of a VAPP, including vApp1 401-1 and vApp2 401-2 coupled to a VLAN 410. Each of the illustrated VAPPs 401 includes or encompasses two VMs 210, wherein vApp1 401-1 includes or encompasses VMs 210-1 and 210-2 while vApp2 401-2 includes or encompasses VMs 210-3 and 210-4. As suggested by FIG. 4, the illustrated VAPPs 401 combine multiple VMs 210 into a distinct virtualized object. The VMs 210 associated with a VAPP 401 may represent some or all of the micro services that provide an enterprise application. As an illustrative example, a VAPP 401 may include a first VM 210-1 to provide a front-end web server, a second VM 210-2 to provide an application server, and a third VM (not explicitly depicted in FIG. 4) to provide a backend database server.

In at least some instances, vApp2 401-2 may be created by cloning vApp1 401-1. If the media access control (MAC) addresses of the VMs 210 in vApp2 401-2 are not modified, those of ordinary skill in the field of access networks will recognize the potential for conflict and ambiguity resulting from the presence of multiple resources coupled to an Ethernet VLAN sharing a common MAC address. In addition to addressing problems associated with a potentially excessive number of virtualized resources contending for a potentially scare number of virtualized network resources, disclosed systems and method for implementing VLAN times slots would also address the duplicated MAC address issue by assigning each resource that shares the common address to a corresponding VLAN time slot.

Figure 5:
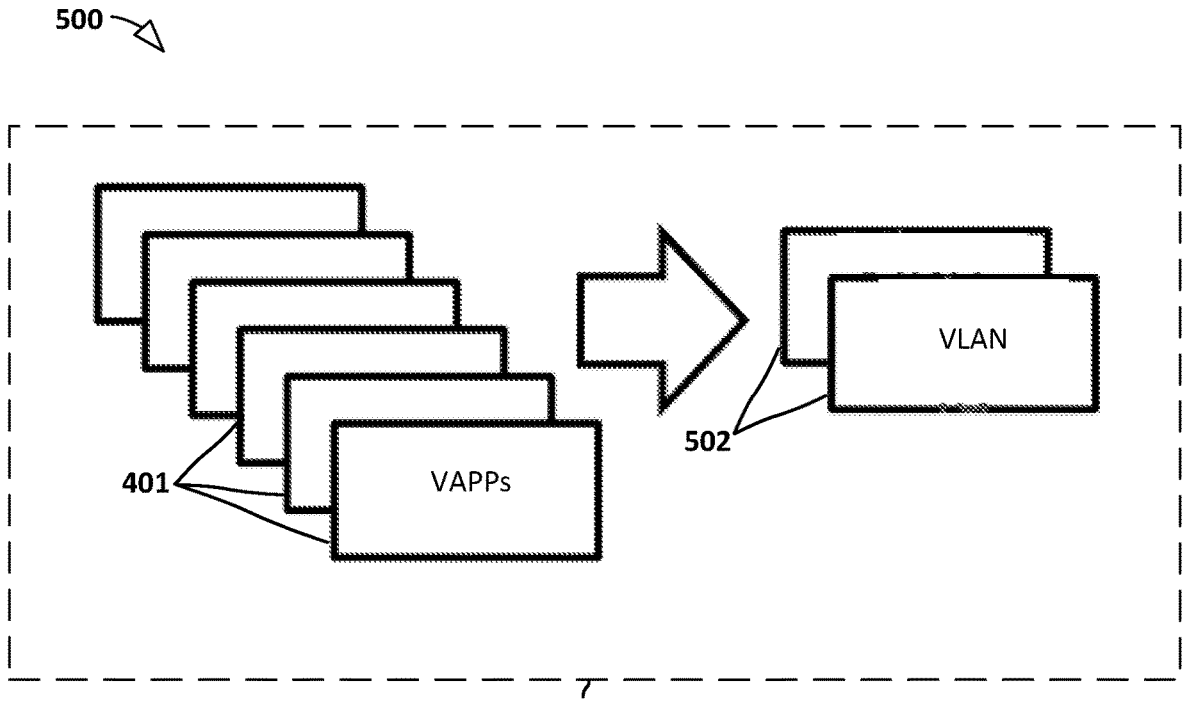
FIG. 5 illustrates a multitude of VAPPs contending for a comparatively scare number of VLANs.

FIG. 5 illustrates the previously discussed issue of conflict and/or contention that may result from a potentially very large number of virtualized compute resources, represented in FIG. 5 by the plurality of VAPPs 401, executing within a layer 2 domain 501, such as an IEEE 802.3 Ethernet domain, contending for a comparatively scare number of virtualized network resources 502 including, but not strictly limited to, VLANs under IEEE 803.1Q.

Figure 6:
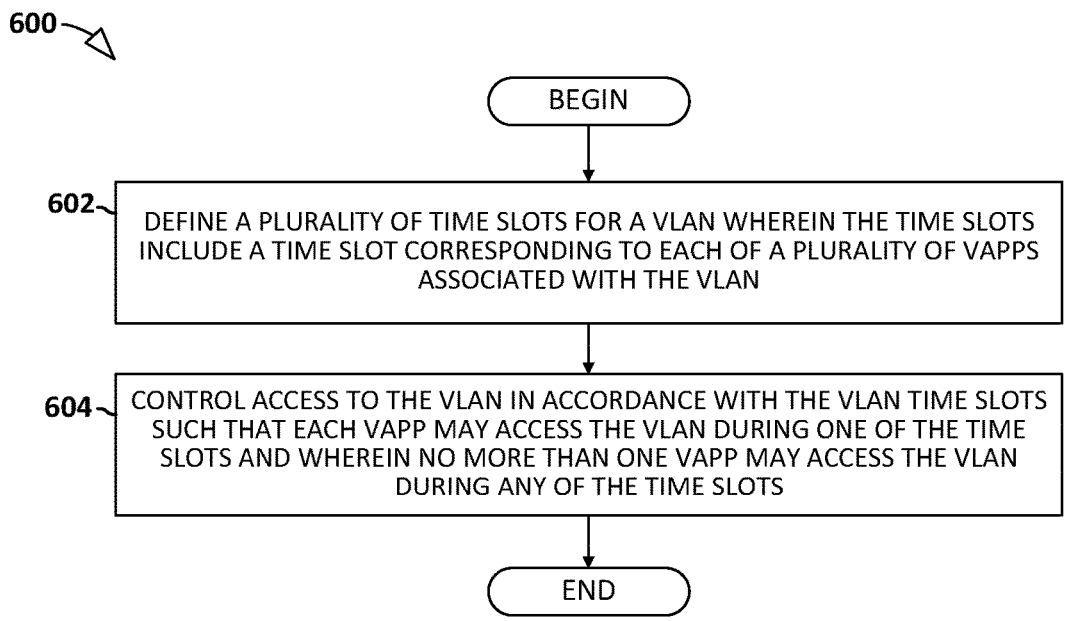
FIG. 6 illustrates a flow diagram of a disclosed resource management method in accordance with disclosed teachings.

FIG. 6 is a flow diagram illustration of a method 600 for managing virtualized network resources including, but not strictly limited to, VLANs. The illustrated method 600 may be suitable for use in conjunction with VAPPs and other virtualized compute resources instantiated within an HCI environment. The illustrated method 600, which may be performed by a management resource such as the platform administrator 102 or PRM 114 illustrated in FIG. 1, defines (operation 602) a plurality of VLAN time slots for one or more VLANs, each of which may be associated with a unique and corresponding VID. The VLAN time slots defined for a VLAN may include a time slot corresponding to each of a plurality of instantiated VAPPs associated with the VLANs VID. If, as an example, ten (10) instantiated VAPPs are assigned to or otherwise associated with a particular VID, the management resource may define ten VLAN time slots for each VLAN cycle, with each VLAN time slot being associated with a corresponding VAPP in a 1:1 relationship.

The management resource may then control access (operation 604) to each VLAN in accordance with the defined VLAN time slots such that each VAPP associated with a particular VID, may access the corresponding VLAN during one, and no more than one, of the defined VLAN time slots and wherein no more than one VAPP may access the VLAN during any of the defined VLAN time slots. An exemplary implementation of VLAN time slots is described in more detail below with respect to FIG. 7.

In at least one embodiment, the VLAN time slots and the time slot based access control described herein are implemented as layer 2 or data link layer features. In these embodiments, the implementation and management of the VLAN time slots is, beneficially, transparent to application layer software.

Figure 7:
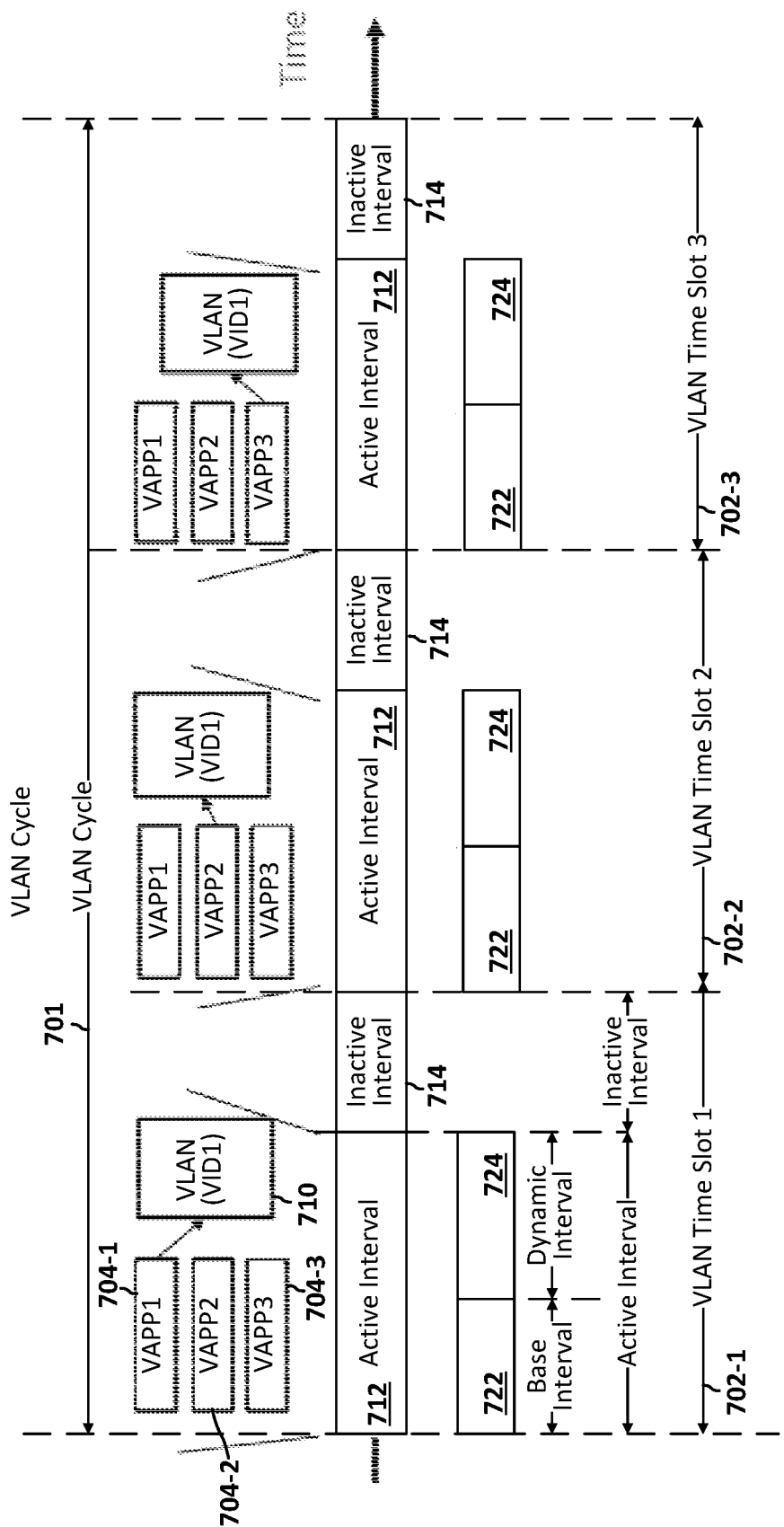
FIG. 7 illustrates an exemplary implementation of VLAN time slots in accordance with disclosed teachings.

Referring now to FIG. 7, an exemplary implementation of the previously described VLAN time slots is illustrated for a hypothetical VLAN 710. Specifically, FIG. 7 illustrates an exemplary VLAN cycle 701, which includes three VLAN time slots (702-1, 702-2, and 702-3) corresponding to the three instantiated, active, and/or executing VAPPs 704 (VAPP1 704-1, VAPP2 704-2, and VAPP3 704-3) that are associated with VLAN 710. As depicted, the illustrated VLAN 710 has a VID value of VID1 and the three illustrated VAPPS 704 are configured to use VID1 as the value in the VID field of a header for a transmitted packet. The VAPPs 704 illustrated in FIG. 7 are intended to represent all active VAPPs associated with VLAN 710. For the sake of clarity, only three VAPPS are shown in FIG. 7, but those of ordinary skill will recognize that more than three VAPPS may be associated with a particular VLAN 710.

Each of the VLAN time slots 702 illustrated in FIG. 7 is comprised of an active interval 712 and an inactive interval 714. In at least some embodiments, packet transmission and/or processing is permitted during active intervals 712 and prohibited during inactive intervals 714. Thus, each VAPP 704 may access or connect to VLAN 710 during the active interval 712 of the appropriate VLAN time slot 702. In FIG. 7, for example, VAPP1 704-1 may connect to VLAN 710 during the active interval 712 of first VLAN time slot 702-1, VAPP2 may connect to VLAN 710 during the active interval 712 of second VLAN time slot 702-2, and so forth.

FIG. 7 further illustrates an implementation in which each active interval 712 includes a fixed-interval portion, identified in FIG. 7 as base interval 722, and a variable interval portion, identified in FIG. 7 as dynamic interval 724. In at least some embodiments, the duration of the variable interval may vary with time based on one or more parameters, characteristics, or conditions. As an example, the management resource may monitor packet traffic associated with each VAPP for one or more VLAN cycles. The management resource may then define a duration of the dynamic interval 724 for each VAPP based on the packet traffic relative to packet traffic associated with each of the one or more other VAPPs.

The management resource may, in at least some embodiments, re-calculate durations of the dynamic interval 724 for each VLAN time slot 702 based on one or more parameters and a dynamic interval algorithm. In at least one embodiment, the management resource may access data indicative of the total number of packets transmitted during a previous VLAN cycle, the total duration of the VLAN cycle, and the number of VAPPs associated with the particular VLAN. With this data, the management resource may determine a dynamic interval total, which is equal to the sum of the durations of each individual dynamic interval 724. The dynamic interval total may then be allocated to the dynamic intervals 724 of each VAPPs based, at least in part, on the percentage of total packet traffic handled by a particular VLAN. To illustrate for the example in which three VAPPs are associated with a particular VLAN, after calculating the total dynamic interval for one or more previous VLAN cycles, durations for each dynamic interval 724 for the next VLAN cycle may be calculated. If a first VAPP transmitted 25% of all packet traffic handled by a particular VLAN, the dynamic interval 724 during the next time cycle might calculated as 25% of the total dynamic interval for a prior VLAN cycle.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system management method, comprising:
defining virtual local area network (VLAN) time slots for a VLAN corresponding to a particular VLAN identifier (VID); and
controlling access to the VLAN in accordance with the plurality of VLAN time slots, wherein each of the plurality of virtual applications (VAPPs) may access the VLAN during one of the plurality of VLAN time slots and wherein no more than one of the plurality of VAPPs may access the VLAN during any of the VLAN time slots, wherein each VLAN time slot is associated with a corresponding virtual application and includes an active interval, during which one or more packets may be transmitted, and an inactive interval during which packet transmission is prohibited;
wherein the active interval includes a base interval and a dynamic interval, wherein a duration of the base interval is fixed and a duration of the dynamic interval is variable, wherein the duration of the dynamic interval for a particular virtual application is based, at least in part, on a packet ratio for the particular virtual application wherein the packet ratio indicates a ratio of the packets transmitted by the particular virtual application during the one or more VLAN cycles to the total number of packets transmitted during the one or more previous VLAN cycles.

2. The method of claim 1, wherein defining the VLAN time slots comprises defining one VLAN time slot per VLAN cycle for each of the plurality of virtual applications.

3. The method of claim 2, wherein defining the VLAN time slots comprises defining the VLAN time slots dynamically wherein durations of the VLAN time slots are re-calculated for each VLAN cycle.

4. The method of claim 1, wherein a length of the VLAN time slot for a particular virtual application is determined based, at least in part, on a number of packets transmitted by the particular virtual application during one or more previous VLAN cycles.

5. The method of claim 1, wherein a duration of the dynamic interval for a particular virtual application is based, at least in part, on a number of packets transmitted by the particular virtual application during one or more previous VLAN cycles.

6. The method of claim 1, wherein the duration of the dynamic interval for a particular virtual application is equal to a product of the packet ratio for the particular application during a previous VLAN cycle and a sum of all dynamic intervals for the previous VLAN cycle.

7. The method of claim 1, wherein the HCI environment includes a plurality of distinct VLANs corresponding to a plurality of VIDs and wherein VLAN time slots are defined for each the plurality of VIDs.

8. An information handling system comprising:
a central processing unit; and
a non-transitory memory resource, communicatively couple to the CPU, including process-executable program instructions that, when executed by the CPU cause the information handling system to perform management operations comprising:
defining a plurality of virtual local area network (VLAN) time slots for a VLAN, wherein the plurality of VLAN time slots include a VLAN time slot corresponding to each of a plurality of virtual applications (VAPPs) associated with the VLAN; and
controlling access to the VLAN in accordance with the plurality of VLAN time slots, wherein each of the plurality of VAPPs may access the VLAN during one of the plurality VLAN time slots and wherein no more than one of the plurality of VAPPs may access the VLAN during any of the VLAN time slots, wherein each VLAN time slot is associated with a corresponding virtual application and includes an active interval, during which one or more packets may be transmitted, and an inactive interval during which packet transmission is prohibited;
wherein the active interval includes a base interval and a dynamic interval, wherein a duration of the base interval is fixed and a duration of the dynamic interval is variable, wherein the duration of the dynamic interval for a particular virtual application is based, at least in part, on a packet ratio for the particular virtual application wherein the packet ratio indicates a ratio of the packets transmitted by the particular virtual application during the one or more VLAN cycles to the total number of packets transmitted during the one or more previous VLAN cycles.

9. The information handling system of claim 8, wherein defining the VLAN time slots comprises defining one VLAN time slot per VLAN cycle for each of the plurality of virtual applications.

10. The information handling system of claim 9, wherein defining the VLAN time slots comprises defining the VLAN time slots dynamically wherein durations of the VLAN time slots are re-calculated for each VLAN cycle.

11. The information handling system of claim 8, wherein a length of the VLAN time slot for a particular virtual application is determined based, at least in part, on a number of packets transmitted by the particular virtual application during one or more previous VLAN cycles.

12. The information handling system of claim 8, wherein a duration of the dynamic interval for a particular virtual application is based, at least in part, on a number of packets transmitted by the particular virtual application during one or more previous VLAN cycles.

13. The information handling system of claim 8, wherein the duration of the dynamic interval for a particular virtual application is equal to a product of the packet ratio for the particular application during a previous VLAN cycle and a sum of all dynamic intervals for the previous VLAN cycle.

14. The information handling system of claim 8, wherein the HCI environment includes a plurality of distinct VLANs corresponding to a plurality of VIDs and wherein VLAN time slots are defined for each the plurality of VIDs.

* * * * *